US010150203B1

(12) United States Patent
Sullivan et al.

(10) Patent No.: US 10,150,203 B1
(45) Date of Patent: Dec. 11, 2018

(54) REDUCED NOISE ABRASIVE BLASTING SYSTEMS

(71) Applicant: OCEANIT LABORATORIES, INC., Honolulu, HI (US)

(72) Inventors: Christopher Sullivan, Honolulu, HI (US); Daniel Kokubun, Waipahu, HI (US)

(73) Assignee: OCEANIT LABORATORIES, INC., Honolulu, HI (US)

( * ) Notice: Subject to any disclaimer, the term of this patent is extended or adjusted under 35 U.S.C. 154(b) by 43 days.

(21) Appl. No.: 14/826,694

(22) Filed: Aug. 14, 2015

Related U.S. Application Data (60) Provisional application No. 62/039,891, filed on Aug. 20, 2014.

(51) Int. Cl.
*B24C 5/04* (2006.01)
*B24C 3/02* (2006.01)
*B24C 3/04* (2006.01)

(52) U.S. Cl.
CPC ............... *B24C 5/04* (2013.01); *B24C 3/02* (2013.01); *B24C 3/04* (2013.01)

(58) Field of Classification Search
CPC ....... B24C 5/04; B24C 7/0007; B24C 7/0038; B24C 7/0046; B24C 7/0084; B24C 3/02; B24C 3/04
See application file for complete search history.

(56) References Cited

U.S. PATENT DOCUMENTS

| 578,983 | A | * | 3/1897 | Green | F16L 33/24 |
| | | | | | 285/245 |
| 1,940,972 | A | * | 12/1933 | Schwartzkopf | B24C 5/04 |
| | | | | | 451/90 |
| 3,032,930 | A | * | 5/1962 | Williams | B05B 1/00 |
| | | | | | 451/102 |
| 3,612,405 | A | * | 10/1971 | Heinrich | B24C 5/04 |
| | | | | | 239/427.3 |
| 3,788,676 | A | * | 1/1974 | Lossie | F16L 33/24 |
| | | | | | 285/247 |

(Continued)

OTHER PUBLICATIONS

Settles, G.S. and Garg, S., A Scientific View of the Productivity of Abrasive Blasting Nozzles, Journal of Thermal Spray Technology, Mar. 1996, pp. 35-41, vol. 5(1), ASM International.

(Continued)

*Primary Examiner* — Timothy V Eley
(74) *Attorney, Agent, or Firm* — Symbus Law Group, LLC; Clifford D. Hyra (57) ABSTRACT

Reduced noise abrasive blasting assemblies and systems are described. The new assemblies and systems are comprised of standard blast hose, accelerator hose, couplings and nozzle. The improved abrasive blasting system maintains abrasive particle velocity while decreasing the exit gas velocity and consequently decreasing sound production. This is accomplished through an acceleration section with reduced inner diameter and sufficient length to provide the necessary abrasive particle velocity. The new system maintains the productivity and efficiency of conventional abrasive blasting systems but with greatly reduced acoustic noise production and reduces operator fatigue due to the lower weight of the carried portion of the system.

19 Claims, 12 Drawing Sheets

(56) References Cited

U.S. PATENT DOCUMENTS

| | | | | | |
|---|---|---|---|---|---|
| 4,253,610 | A | * | 3/1981 | Larkin | B24C 7/0084 |
| | | | | | 239/430 |
| 4,708,214 | A | * | 11/1987 | Krawza | B24C 1/045 |
| | | | | | 175/424 |
| 4,708,534 | A | * | 11/1987 | Gallant | B24C 7/0046 |
| | | | | | 198/757 |
| 5,283,990 | A | * | 2/1994 | Shank, Jr. | B05B 1/044 |
| | | | | | 239/592 |
| 5,365,702 | A | * | 11/1994 | Shank, Jr. | B05B 1/044 |
| | | | | | 451/38 |
| 5,671,954 | A | * | 9/1997 | Cheramie | F16L 27/0816 |
| | | | | | 285/272 |
| 6,036,584 | A | * | 3/2000 | Swinkels | B24C 1/04 |
| | | | | | 451/102 |
| 6,390,898 | B1 | * | 5/2002 | Pieper | B08B 3/024 |
| | | | | | 451/100 |

OTHER PUBLICATIONS

Settles, Gary S. and Geppert, Stephen T., Redesigning Blasting Nozzles to Improve Productivity, Journal of Protective Coatings & Linings, Oct. 1996, pp. 64-72, vol. 13(10).

Powell, Alan, On the Generation of Noise by Turbulent Jets, ASME Publication, 1959.

* cited by examiner

REDUCED NOISE ABRASIVE BLASTING SYSTEMS

CROSS-REFERENCE TO RELATED APPLICATIONS

This application claims the benefit of U.S. provisional patent application Ser. No. 62/039,891 filed Aug. 20, 2014 by the present inventors, which provisional application is incorporated in its entirety by this reference.

STATEMENT REGARDING FEDERALLY SPONSORED RESEARCH OR DEVELOPMENT

This invention was supported in part by government support under Contract FA8222-14-M-0006 with the Department of the Air Force. The government has certain rights in the invention.

FIELD OF THE INVENTION

The invention relates to apparatus and methods for abrasive blasting. More particularly, the invention describes reduced noise abrasive blasting assemblies and systems and methods of constructing such systems.

BACKGROUND OF THE INVENTION

Figure 1:
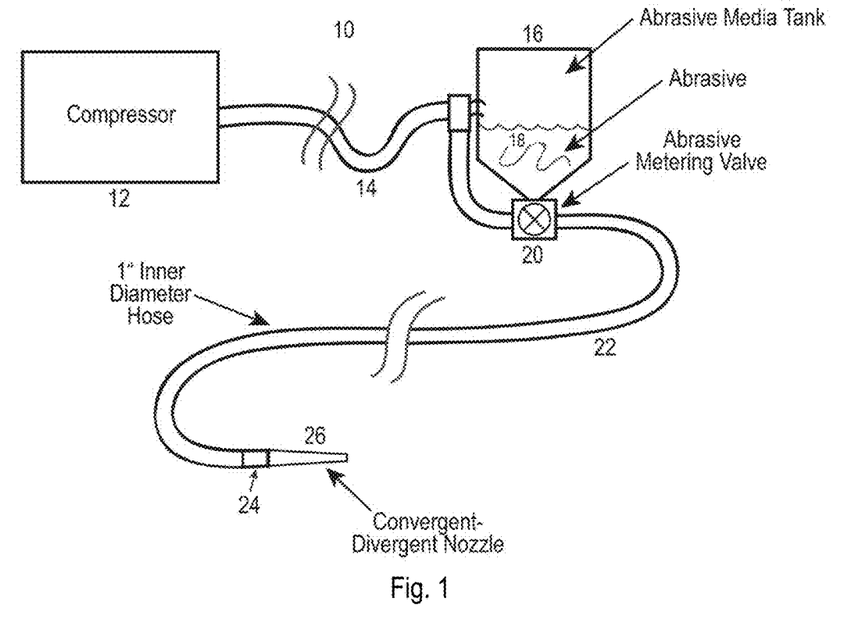
FIG. 1 illustrates a conventional state of the art supersonic abrasive blasting system.

Illustrated in FIG. 1 is a conventional, state of the art supersonic abrasive blasting system 10 comprising a compressor 12, compressor hose 14, and abrasive tank 16 containing abrasive media 18. An abrasive metering valve 20 controls the rate of release of abrasive media 18 into a standard blast hose 22. Release media 18 travels through a blast hose 22 to a claw coupling 24 and through supersonic convergent-divergent nozzle 26 where it is released into the environment at supersonic speed and with considerable noise.

Figure 2:
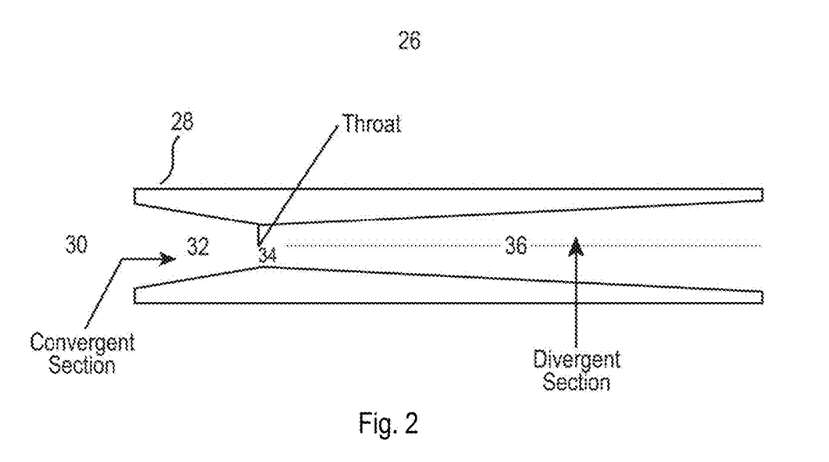
FIG. 2 depicts, in cross section, a conventional supersonic convergent-divergent nozzle used in the abrasive blasting system illustrated in FIG. 1.

Details of state of the art convergent-divergent nozzle 26 are depicted in FIG. 2 in cross section. Nozzle 26 is comprised of a barrel 28 having a bore 30 with a convergent bore section 32, throat 34, and divergent bore section 36. Carrying gases mixed with abrasive media 18 are compressed when traveling through convergent section 32 and then dispersed through divergent section 36, causing media 18 particles to accelerate within the divergent section 36 of nozzle 26 and out therefrom.

Conventional abrasive blasting system setups utilize a single 1" inner diameter blast hose 22 with a convergent-divergent type supersonic nozzle attachment 26. The abrasive blasting media in these setups undergo most of their acceleration over a short distance in and following exit from nozzle 26.

Figure 3:
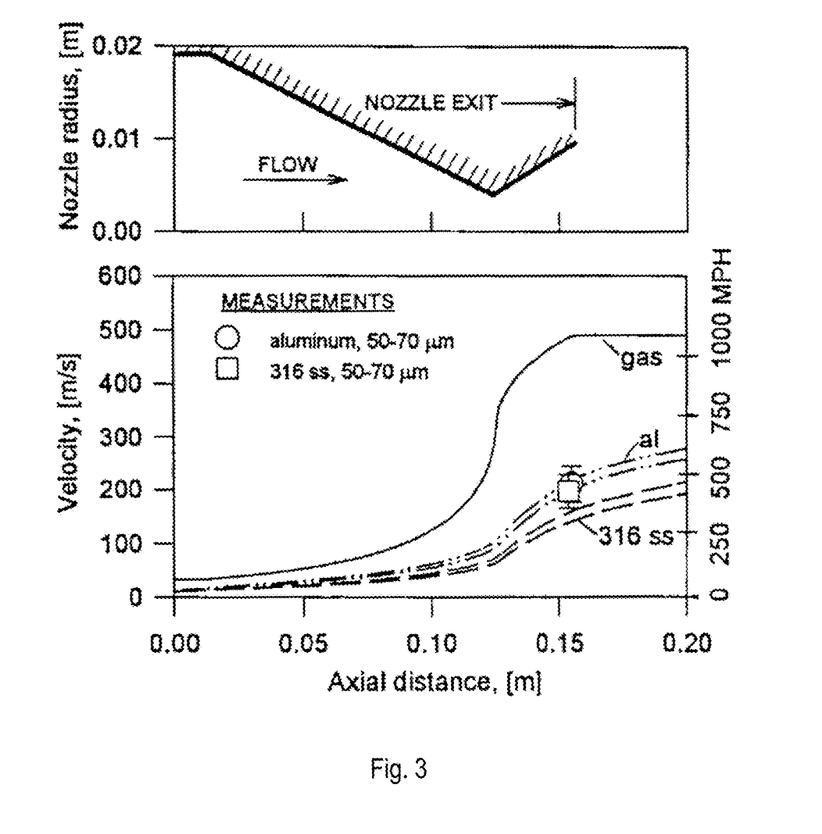
FIG. 3 reproduce graphs from Settles' paper (Settles G., A scientific view of the productivity of abrasive blasting nozzles, 1996), showing predicted and measured velocities through a conventional Laval nozzle and the large difference between abrasive velocity and exit gas velocity.

As demonstrated in Settles' paper (Settles G., A scientific view of the productivity of abrasive blasting nozzles, 1996), particles accelerate from fairly modest velocities before the nozzle, to higher velocities as the particles flow through the diverging portion of the nozzle and the exit. This minimizes wear in the hose, especially for highly abrasive media. This behavior is illustrated in the graphs reproduced from Settles' paper in FIG. 3, showing predicted and measured velocities through a Laval nozzle.

Currently available abrasive blasting systems as the one depicted in FIGS. 1 and 2 produce excessive noise which exceeds levels set by occupational safety organizations for work environment noise and, as a result, require the use of personal protective equipment for hearing protection as well as time limits for operator exposure to this noise. Accordingly, there is a need for abrasive blasting systems that produce less noise while still demonstrating equivalent productivity and efficiency.

Currently available abrasive blasting systems as the one depicted in FIGS. 1 and 2 are large and heavy, creating stress and fatigue for the user. As such, there is a need for abrasive blasting systems that are smaller and lighter for ease of use and longer periods of use.

SUMMARY OF THE INVENTION

These and other objects are accomplished in the reduced noise abrasive blasting assemblies and systems of the subject invention. The new assemblies and systems provide for effective abrasive blasting with significantly less noise than current state of art while reducing ergonomic stress from the size and weight of the carried portion of the systems.

The new assemblies and systems are comprised of standard blast hose, a novel accelerator hose portion, couplings including a transition coupling, and nozzle. The improved abrasive blasting system maintains the desired abrasive particle velocity while decreasing the exit gas velocity and consequently decreasing sound production. This is accomplished through an acceleration hose section with reduced inner diameter and sufficient length to provide the necessary abrasive particle velocity. The new systems maintain the productivity and efficiency of conventional abrasive blasting systems but with greatly reduced acoustic noise production and reduced operator fatigue due to the lower weight of the carried portion of the system.

One aspect of the subject invention is abrasive blasting apparatus that produce significantly less noise than conventional supersonic abrasive blasting systems while demonstrating equivalent efficiency and blasting results when compared with prior art supersonic abrasive blasting apparatus.

A further aspect of the subject invention is abrasive blasting apparatus having a carried portion that is smaller and lighter than conventional supersonic abrasive blasting systems while demonstrating equivalent efficiency and results.

Another aspect of the subject invention is abrasive blasting systems that employ a length of accelerator hose having an inside diameter smaller than conventional standard blast hose, taken over an additional length, to accelerate the media particles to a desired velocity prior to the particles entering the blast nozzle.

A further aspect of the subject invention is the use of transition coupling to step down the inner diameter of the media path from the standard blast hose to the accelerator hose.

The subject invention achieves sufficient abrasive particle velocity through greater acceleration distances in an airstream with a lower exit velocity, thereby reducing the nozzle generated noise experienced with supersonic blast nozzles. Adjustments to blasting productivity can be made by adjusting the abrasive mass flow rate.

DETAILED DESCRIPTION OF PREFERRED EMBODIMENTS

A solution to the problem of excessive noise from state of the art supersonic abrasive blasting systems is found as set forth in the following.

Figure 4:
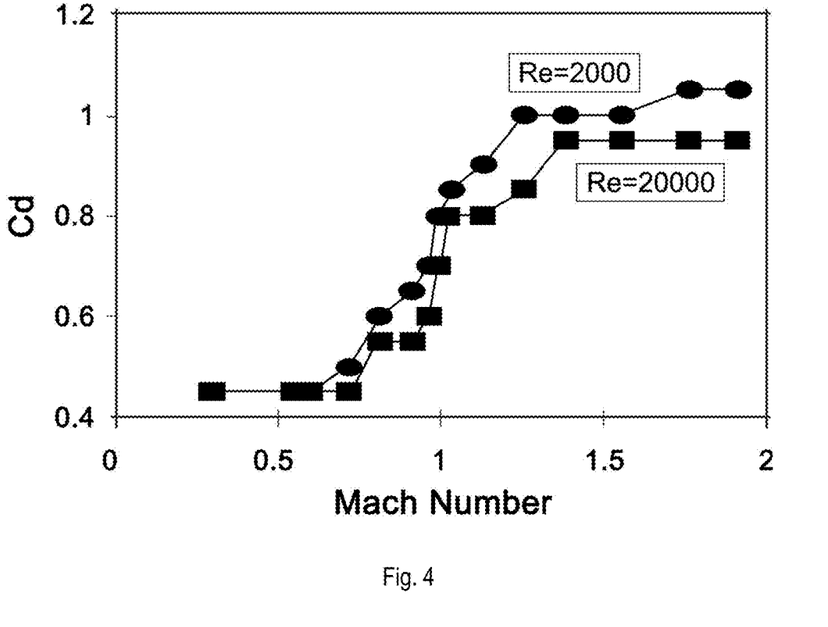
FIG. 4 is a graph showing the drag coefficient as a function of Mach number for two Reynolds numbers for spheres.

The acceleration of particles in a stream can be modeled using empirically determined drag coefficient presented previously (Settles & Geppert, 1997) based on data from Bailey and Hialt. The acceleration of a particle of mass, m, is found from the drag, D, as $$a = \frac{D}{m} = \frac{1}{m}\frac{1}{2}\rho U_{rel}^2 A C_d$$

where A is the cross-sectional area of the sphere and $U_{rel}$ is the relative velocity between the gas and the particle. Illustrated in FIG. 4 is the drag coefficient as a function of Mach number for two Reynolds numbers for spheres.

Previous studies have demonstrated that the noise power, P, of a jet scales with the eighth power of velocity and the square of jet diameter (Powell, 1959) as $$P \propto U^8 D^2$$

Furthermore, sound pressure level, SPL, is proportional to sound power level, SWL where $$SWL = 10\log\left(\frac{\text{Power}}{1\times 10^{-12} W}\right)$$

As a result, it can be inferred that SPL, velocity and diameter scale as:

$$SPL_2 - SPL_1 = 80\log\left(\frac{U_2}{U_1}\right)$$

Figure 5:
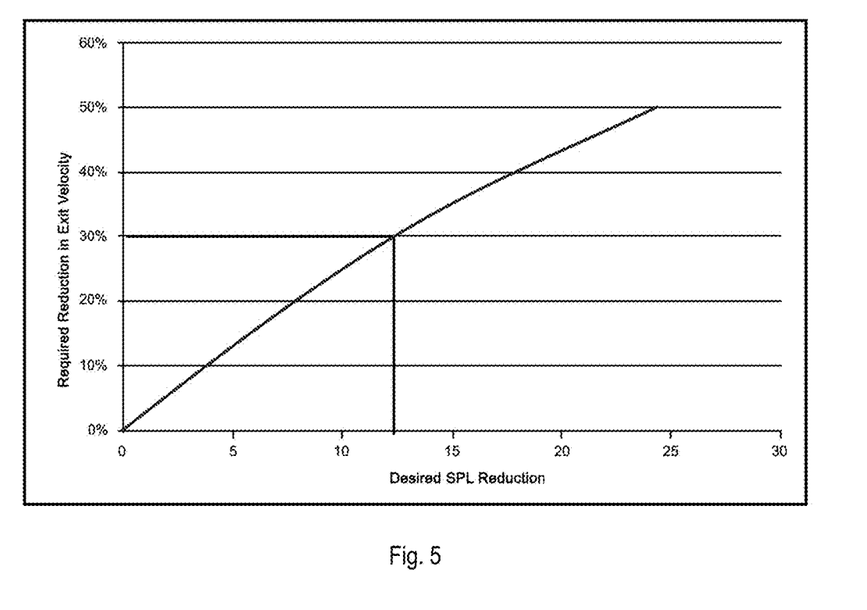
FIG. 5 is a graph showing the required reduction in jet exit velocity to achieve desired reduction in Sound Pressure Level (SPL) based on the relationship of jet exit velocity to jet noise production.

This relationship is shown in graph form in FIG. 5. Thus, if the exit velocity of the nozzle is reduced by 30%, for example, then a drop in SPL of 12.5 dB is expected.

In order to have the same production as a current state of the art nozzle blasting system, the velocity of the particles must be maintained. Conventional nozzles, as illustrated in FIG. 2, have much higher gas velocities than particle velocities, and these high gas velocities are responsible for high sound production levels. The subject invention maintains the particle velocity while decreasing the nozzle exit gas velocity and such, decreasing the sound production. This requires a longer acceleration length relative to conventional art nozzle blasting systems.

The mass of the sphere is the density of the particle, $\rho_{particle}$ multiplied by the volume $$\frac{4}{3}\pi r^3.$$

So acceleration becomes $$a = \frac{3}{8}C_d \frac{\rho_{gas}}{\rho_{particle}} \frac{U_{rel}^2}{r}$$

Figure 6:
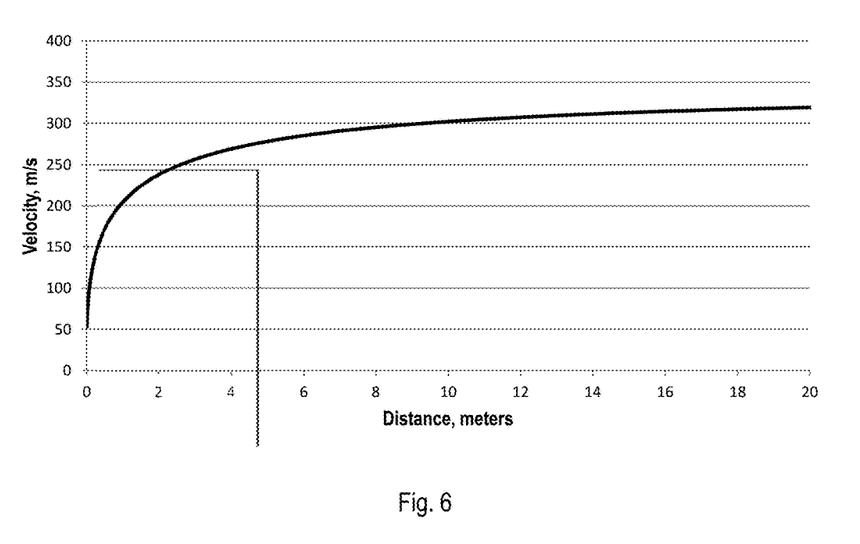
FIG. 6 is a graph demonstrating modeled particle velocity versus distance in 345 m/s accelerator section for Type V acrylic media 20/30 mesh.

The solution can be found in a stepwise manner and is shown in FIG. 6 for Type V acrylic media of 20/30 mesh in an air stream with a velocity of 345 m/s. This demonstrates that to achieve 275 m/s particle velocity a 4 meter accelerator section is required.

Based on an estimated exit velocity of 483 m/s from a previous model of the Marco #8 nozzle operating at 40 psi pressure, an exit velocity reduction of 30% to 345 m/s (roughly sonic) produced a 12.5 dB reduction in SPL. The length of hose then needs to be sufficiently long to match the particle velocity of the #8 nozzle at 40 psi.

The instant invention achieves sufficient abrasive particle velocity through greater acceleration distances in an airstream with a lower exit velocity, thereby reducing nozzle generated noise experience with supersonic blast nozzles. Adjustments to blasting productivity can be made by adjusting the abrasive mass flow rate.

Figure 7:
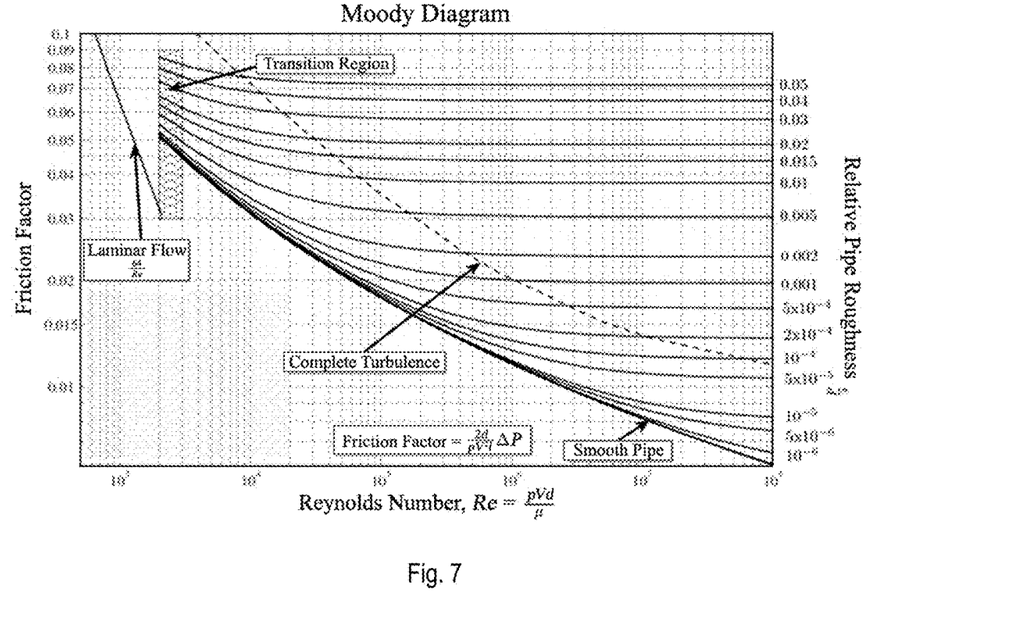
FIG. 7 is a Moody Diagram used for estimation of Friction Factor from Reynolds Number and pipe roughness.

Pressure loss, or head loss, is unavoidable and must be considered. As the length of the hose increases, the pressure will decrease and eventually decrease the flow velocity. But this loss can be calculated. The head loss, or pressure loss, due to friction along a pipe is given by the Darcy-Weisbach equation as $$\Delta p = f_D \frac{L}{D} \frac{\rho V^2}{2}$$

where L is the length of the pipe section, D is the pipe diameter, p is the density of the fluid, V is the average fluid velocity, and $f_D$ is the Darcy friction factor based on Reynolds Number, Re and relative pipe roughness, $\epsilon/d$ and is equal to approximately 0.02 for plastic/rubber. FIG. 7 shows a Moody Diagram used for estimation of Friction Factor from Reynolds Number and pipe roughness.

A ¾" inner diameter blast hose operating close to "choked" condition has a velocity of 230 to 340 m/s and a Reynolds number of 300,000 to 436,000. Drag over the length of the hose induces pressure losses which decrease the average velocity in the pipe.

Velocity in the hose will be sonic if the choked flow conditions exist where the pressure downstream falls below a critical value, p*, given by $$\frac{p^*}{p_0} = \left(\frac{2}{k+1}\right)^{\frac{k}{k-1}}$$

where the heat capacity ratio, k, is 1.4 for air, giving $$p^* = 0.528 p_0$$

For 40 psi gage pressure, or 54.7 psi absolute pressure, p* is 28.9 psia or 14.2 psig.

Based on the results of analytical models discussed above, a preferred embodiment of the subject invention was designed that takes airborne particles from the example 1" hose and accelerate them through a smaller diameter hose a sufficient distance such that a productive particle speed is obtained. Transition couplings that step down the inside diameter of the hose provide smooth transitions between the different hose section diameters with minimal pressure losses.

Figure 8:
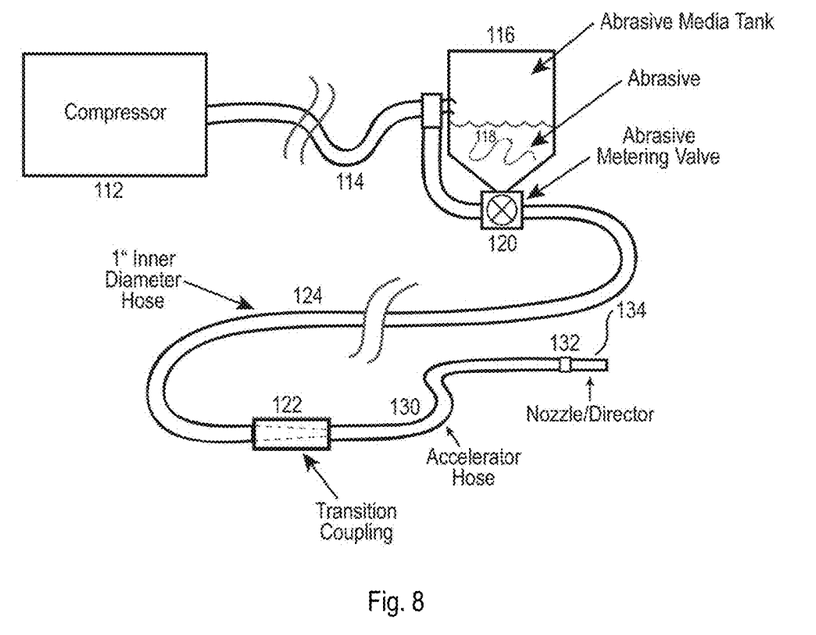
FIG. 8 illustrates the major component parts of a preferred embodiment of the improved reduced noise abrasive blasting system of the subject invention.

According to a preferred embodiment of the reduced noise abrasive blasting systems of the subject invention depicted in FIG. 8, compressor 112 pressurizes gas to near 120 psi. Compressed carry gas is pumped through initial hose section 114 into abrasive media tank 116 containing abrasive media 118 to mix with the media 118 and carry the media 118 through the system. An abrasive metering valve 120 controls the rate of release of abrasive media 118. A standard 1" inside diameter blast hose 124 attaches, at one end to metering valve 120 and, at the other end, to a transition coupling 122. A length of reduced inside diameter, ¾" for example, accelerator hose 130 connects transition coupling 122 to a nozzle 134 through a claw coupling 132. Transition coupling 122 serves to step down the inside diameter of the path that is taken by abrasive media 118 from the 1" diameter blast hose 124 to the smaller diameter acceleration hose 130.

Figure 9:
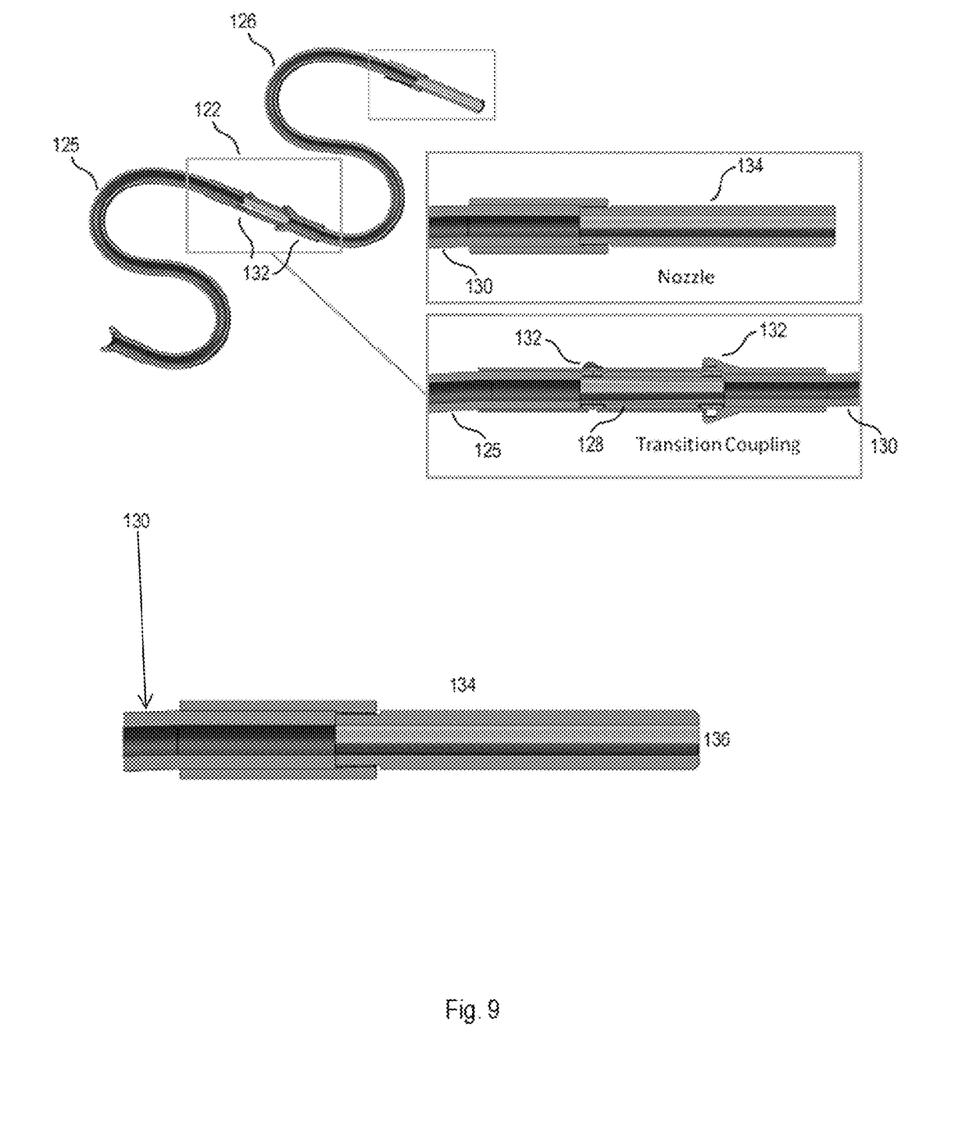
FIG. 9 shows, in cross-section, details of the transition coupling used to step down the inside diameter of the abrasive media path employed in the reduced noise abrasive blasting system illustrated in FIG. 8 and the relative geometry of the nozzle and accelerator hose.

The details of transition coupling 122, and nozzle 134, are illustrated, in cross-section, in FIG. 9. Coupling 122 is comprised of housing 128 enclosing a bore (not shown). The blast hose side 125 of transition coupling 122 has a 1" inside diameter bore, while the accelerator side 130 of transition coupling 122 has a ¾" diameter bore. Each side of transition coupling 122 connects with the respective hose using conventional claw coupling 132 technology.

The nozzle 134 exit diameter 136 is sized to control the desired abrasive "hot spot" diameter such that the effective blasting region of the reduced noise abrasive blasting system can match that of a conventional supersonic nozzle.

Other preferred embodiments of the reduced noise abrasive blasting systems of the present invention are systems that comprise more than one section of acceleration hose and that employ more than one transition coupling, each section of acceleration hose having a decreasing inside diameter. Other types of couplings, nozzles, metering valves and abrasive media may be employed in the systems of the instant invention without departing from the scope of the invention.

EXAMPLES

Initial Prototype Fabrication and Testing

Figure 10:
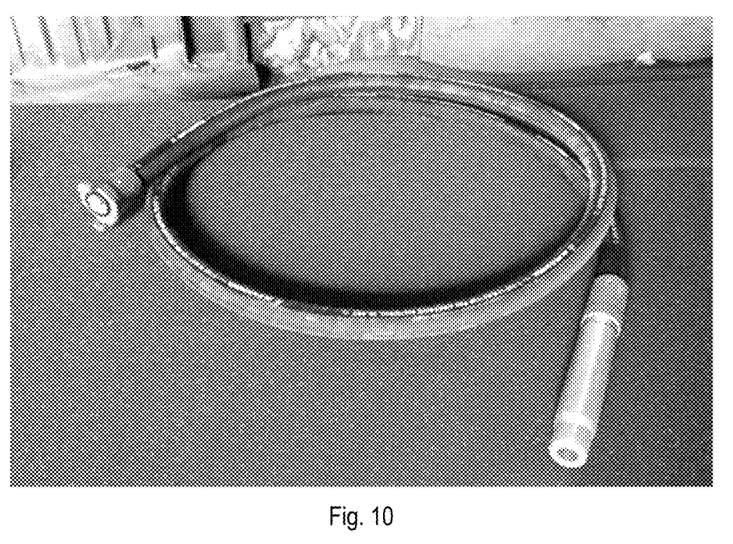
FIG. 10 is a photograph of a prototype reduced noise abrasive blasting accelerator hose and nozzle.

A prototype comprising the component parts illustrated in FIGS. 8 and 9 was fabricated as shown in FIG. 10 with the following characteristics for testing:

Four-meter accelerator section with ¾" inner diameter to achieve sonic conditions (345 m/s)

Straight bore nozzle with 0.79 bore diameter to match output diameter of #8 nozzle to achieve same "hot spot" as current standard #8 setup Couplers, etc.

Sound pressure levels were measured using both handheld integrating sound pressure meter and a stand-alone microphone data acquisition system. Nozzle pressures were measured near the end of the 1" hose before coupler to be 40 psi. Type V media was introduced by opening the media valve 4 full turns. Results of the sound pressure level testing, in dB, were as follows:

| Nozzle | Integrated SPL (dB) |
| --- | --- |
| Marco #8 | 108 |
| QB-1 Prototype | 94.5 |

Figure 11:
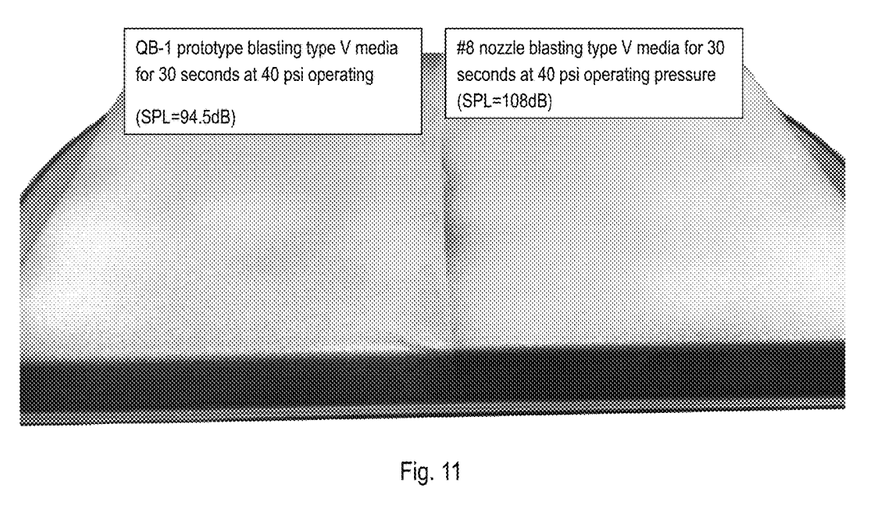
FIG. 11 is a photograph illustrating, in comparative format, productivity of the invention prototype (left side) and conventional blasting (right side) using #8 nozzle blasting Type V media on half of an exposed coated baking pan for 30 seconds, both with 4 turns of abrasive metering valve knob.

Productivity was qualitatively assessed by using both the #8 nozzle and the subject prototype for 30 seconds on an exposed half of a coated baking pan, as illustrated in FIG. 11. The effect of adjusting the abrasive metering valve knob was examined by adjusting the knob to six turns for the prototype and comparing the production of that setup to a Marco #8 nozzle that used the 4-turn setting.

Figure 12:
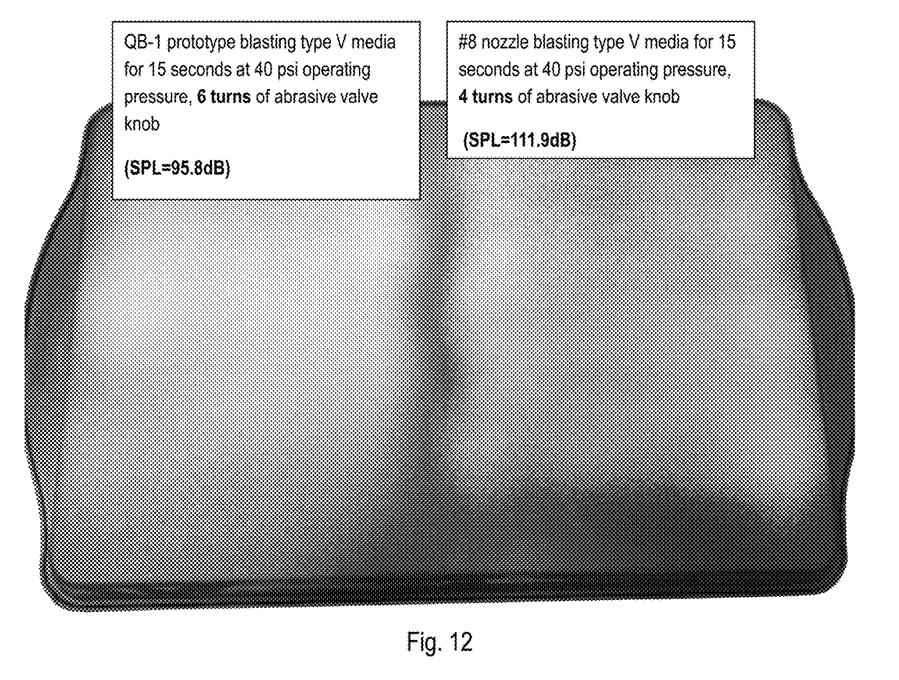
FIG. 12 is a photograph comparing the results of using a reduced noise blasting system of the subject invention operating with additional abrasive to a conventional system operating with a Marco #8 nozzle.

FIG. 12 illustrates that the prototype operating at the 6-turn setting was clearly more productive than the Marco #8 operating at the 4-turn setting. These results show that the subject invention can be operated with equal or better productivity compared to a standard #8 nozzle while producing 16 dB less noise as measured at the operator.

Figure 13:
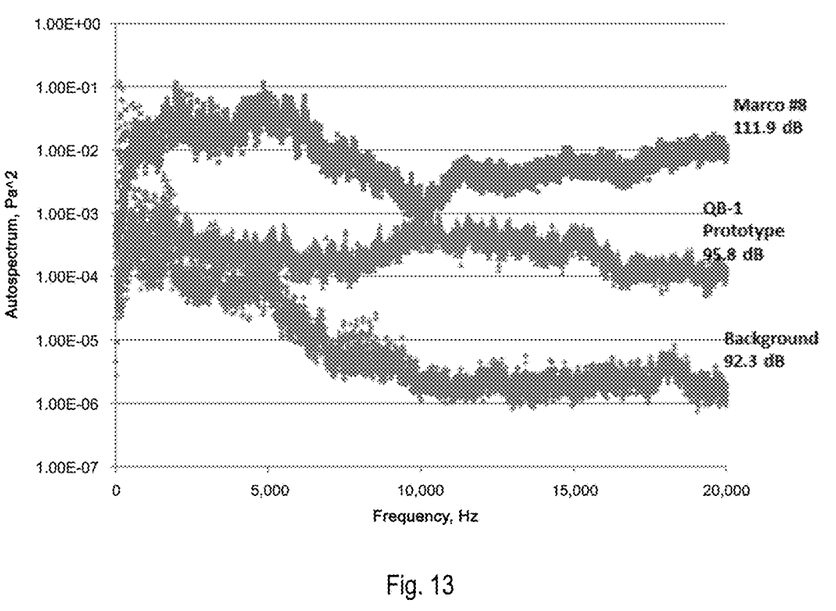
FIG. 13 is an autospectrum of a conventional state of the art supersonic abrasive blasting apparatus with a Marco #8 nozzle and the subject invention prototype with Type V media and 40 psi operating pressure, along with background noise levels from blasting compressor unit.

Testing was also performed to examine total sound pressure levels as well as acoustic spectra for the prototype as compared to a standard #8 nozzle, both operating at 40 psi. The testing results demonstrate noise reduction is broad spectrum, as illustrated in FIG. 13.

SUMMARY AND SCOPE

As will be appreciated from the description, drawings and examples set forth above and referenced herein, the reduced noise abrasive blasting systems of the present invention allow for abrasive blasting with significantly reduced resultant noise while providing the equivalent productivity and efficiency compared with conventional abrasive blasting systems. The improved reduced noise blasting system promotes worker health and safety and a quieter environment for those in the vicinity.

The improved abrasive blasting system exploits a narrowed and lengthened accelerator section in order to maintain particle velocity while decreasing the gas exit velocity. A straight bore nozzle can be used to produce the desired active abrasive area. The maintained particle velocity provides the equivalent abrasive productivity while the decreased gas velocity provides for the reduced resultant noise.

While specific preferred embodiments and examples of fabrication and testing of the invention have been illustrated and described, it will be clear that the invention is not so limited. Numerous modifications or alterations, changes, variations, substitutions and equivalents will occur to those skilled in the art without deviating from the spirit and scope of the invention, and are deemed part and parcel of the invention disclosed herein.

By way of example and not limitation, the nozzle and hose dimensions, and the coupling types, and the specific configuration and sizes of hose, couplings, nozzle and accelerator section, can be varied in accordance with the general principals of the invention as described herein in order to accommodate different working conditions, target materials, project specification, budgetary considerations and user preferences. In addition, more than one transition coupling and accelerator hose section and inside diameter may be employed in the systems of the subject invention. The invention described herein is inclusive of all such modifications and variations.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features.

Accordingly, it is appropriate that the foregoing description be construed broadly and understood as being given by way of illustration and example only, the spirit and scope of the invention being limited only by the claims which ultimately issue.

The invention claimed is:

1. A reduced noise abrasive blasting system for abrasive blasting, the system comprising:
   (a) a flexible first diameter blast hose section;
   (b) a flexible reduced inside diameter accelerator hose section having an inside diameter smaller than that of the first diameter blast hose section; and
   (c) a tube-shaped coupler transitioning from a larger diameter on one side to a smaller diameter on an opposite side, connecting the flexible first diameter blast hose section to the flexible reduced inside diameter accelerator hose section, the reduced insider diameter accelerator hose ending in an output coupling.

2. The reduced noise abrasive blasting system of claim 1, further comprising a blasting nozzle connected to the output coupling of the reduced inside diameter accelerator hose section.

3. The reduced noise abrasive blasting system of claim 2, wherein a blasting nozzle exit diameter is selected to produce a desired diameter of an effective blasting region of abrasive action.

4. The reduced noise abrasive blasting system of claim 1, wherein said coupler further comprises a transition section connecting said first diameter and said reduced inside diameter accelerator hose sections to gradually and smoothly transition from one diameter to a next reduced diameter to reduce pressure losses at the coupler between hose sections.

5. The reduced noise blasting system of claim 1, further comprising abrasive particles carried by a compressed carry gas wherein the length and inside diameter of the reduced inside diameter accelerator hose section are calculated by determining a velocity of the compressed carry gas moving through the reduced inside diameter accelerator hose section for a particular hose length, and then calculating an estimated particle velocity at a nozzle exit, and repeating this calculation for a range of hose lengths and inside diameters and selecting the hose length and inside diameter which provides the best combination of high particle velocity and low gas velocity.

6. The reduced noise abrasive blasting system of claim 1, wherein the reduced diameter accelerator hose section possesses a diameter of about 75% of the diameter of the first diameter blast hose section.

7. The reduced noise abrasive blasting system of claim 1, wherein the rigid tube-shaped coupler comprises a housing enclosing a bore.

8. The reduced noise abrasive blasting system of claim 1, wherein the rigid tube-shaped coupler housing is cylindrical.

9. The reduced noise abrasive blasting system of claim 8, wherein the rigid tube-shaped coupler has an outer diameter greater than that of the first diameter blast hose section and the reduced inside diameter accelerator hose section.

10. The reduced noise abrasive blasting system of claim 1, further comprising one or more further reduced inside diameter accelerator hose sections and one or more further couplers, each of the further reduced inside diameter accelerator hose sections having a diameter less than that of the reduced diameter accelerator hose section.

11. A reduced noise abrasive blasting system, comprising a media tank, an abrasive media, a compressed carry gas to carry the abrasive media, a plurality of flexible hose sections having different inside diameters, at least one transition coupling connecting each of said flexible hose sections together providing a gradual and smooth transition from one diameter to a next diameter, and an output coupling connected to a nozzle and to one of the flexible hose sections, wherein the system is configured for abrasive media to exits the nozzle at supersonic speed and the compressed gas to exit the nozzle at subsonic speed.

12. The reduced noise abrasive blasting system of claim 11, wherein the length and inside diameter of a reduced inside diameter hose section are calculated by determining a velocity of a compressed carry gas moving through the reduced inside diameter hose section for a particular hose length, and then calculating an estimated media particle velocity being carried by said compressed carry gas leaving a nozzle exit, and repeating this calculation for a range of hose lengths and reduced inside diameters and selecting the hose length and reduced inside diameter which provides a best combination of high particle velocity and low gas velocity.

13. The reduced noise abrasive blasting system of claim 11, wherein said hose sections further comprise:
  (a) a first flexible hose section having a 1 inch inside diameter that connects said media tank to a second flexible hose section;
  (b) said second flexible hose section having a ¾ inch inside diameter that connects to said first flexible hose section; and
  (c) a one of the transition couplings connects the first and second flexible hose sections.

14. The reduced noise abrasive blasting system of claim 13, further comprising the nozzle connected to the output coupling at an end of said second hose section opposite from the one of the transition couplings and wherein a diameter of an exit from the nozzle is selected to produce a desired diameter of an effective blasting region of abrasive action.

15. The reduced noise abrasive blasting system of claim 11, further comprising the transition coupling that connects a first hose section to a second hose section to gradually and smoothly transition from a larger diameter to a next smaller diameter to reduce pressure losses at the transition coupling between the first and second hose sections.

16. The reduced noise blasting system of claim 11, wherein a reduced inside diameter hose section having reduced weight is attached to a nozzle and held by an operator, and wherein the reduced noise blasting system imparts lower ergonomic stress to the operator from a reduced weight of a carried portion of the system.

17. An abrasive blasting system employing abrasive media particles carried by a compressed carry gas that produces less noise, the abrasive blasting system comprising:
  (a) a flexible first diameter blast hose section;
  (b) a flexible reduced inside diameter hose section; and
  (c) a transition coupling connecting the flexible first diameter blast hose section to the flexible reduced inside diameter hose section whereby the compressed gas is capable of moving at supersonic speed upon entering the transition coupling;
  (d) wherein a length of the reduced inside diameter hose section provides an accelerator hose section to facilitate acceleration of abrasive media particles to a velocity equal to supersonic speed; and
  (e) wherein the reduced inside diameter hose section is capable of reducing velocity of the compressed carry gas for the abrasive media to less than supersonic speed upon exiting an attached nozzle; and
  (f) wherein the abrasive media is capable of exiting the attached nozzle at supersonic speed using a narrowed and lengthened accelerator section formed by the reduced inside diameter hose section to maintain media particles exit velocity at supersonic speed while decreasing the compressed carry gas exit velocity to subsonic speed.

18. The abrasive blasting system of claim 17, wherein the length and inside diameter of said reduced inside diameter hose section are calculated by determining a velocity of a compressed carry gas moving through the reduced inside diameter hose section for a particular hose length, and then calculating an estimated particle velocity at a hose exit, and repeating this calculation for a range of hose lengths and inside diameters and selecting a hose length and inside diameter which provides the best combination of high particle velocity and low gas velocity.

19. The abrasive blasting system of claim 17, further comprising a nozzle attached to one end of the reduced inside diameter hose section and wherein a nozzle exit diameter is selected to produce a desired diameter of an effective blasting region of abrasive action.

\* \* \* \* \*